United States Patent [19]

Sims

[11] Patent Number: 4,509,897
[45] Date of Patent: Apr. 9, 1985

[54] ROTARY PUMP ASSEMBLY CONTAINER

[76] Inventor: James O. Sims, Rte. 2, Box 246, Hartselle, Ala. 35640

[21] Appl. No.: 496,881

[22] Filed: May 23, 1983

Related U.S. Application Data

[60] Continuation-in-part of Ser. No. 302,643, Sep. 15, 1981, Pat. No. 4,384,820, which is a division of Ser. No. 945,558, Sep. 25, 1978, Pat. No. 4,289,445.

[51] Int. Cl.³ .............................................. F04D 29/10
[52] U.S. Cl. ................................. 415/113; 415/170 A
[58] Field of Search .................... 415/111, 113, 170 A

[56] References Cited

U.S. PATENT DOCUMENTS

| | | | |
|---|---|---|---|
| 1,721,737 | 7/1929 | Joyce | 415/113 |
| 1,835,877 | 12/1931 | Joyce | 415/113 |
| 3,954,348 | 5/1976 | Renaud | 415/113 |
| 4,289,445 | 9/1981 | Sims | 415/174 |
| 4,384,820 | 5/1983 | Sims | 415/113 |

FOREIGN PATENT DOCUMENTS 736187  6/1943  Fed. Rep. of Germany ...... 415/111

Primary Examiner—Everette A. Powell, Jr.
Attorney, Agent, or Firm—C. A. Phillips; Michael L. Hoelter

[57] ABSTRACT

A pump assembly wherein fluid under pressure in a pump housing is prevented from escaping around the drive shaft of the pump by a seal which is held in place by the combination of a spring and fluid pressure applied through a diaphragm or piston from the interior of the pump housing.

1 Claim, 2 Drawing Figures

ROTARY PUMP ASSEMBLY CONTAINER

CROSS-REFERENCE OF RELATED APPLICATION

This application is a continuation-in-part of application Ser. No. 302,643, filed Sept. 15, 1981, U.S. Pat. No. 4,384,820 which is a division of application Ser. No. 945,558, filed Sept. 25, 1978, now U.S. Pat. No. 4,289,445.

TECHNICAL FIELD

This invention relates generally to pumps, and particularly to pumps wherein fluid pressures must be sealed from escape around pump drive shafts, such as with rotary pumps of the centrifugal type.

BACKGROUND ART

A principal cause of failure with centrifugal pumps is seal failure, that is, leakage by deterioration or destruction of shaft seals between the outside and inside of a pump housing. Shaft seals typically employ two frictionally engaging seal members, one of which is held stationary and seals to the pump housing, and the other sealably engages the pump shaft and rotates with and seals to it. In order to perfect the seal, some form of force must be applied to urge one of the sealing members against the other while they relatively rotate. Generally, if not in all cases, the shaft seal member is spring biased against the stationary sealing member. A spring force being a relatively constant force must be selected to provide sufficient force to effect a seal with maximum pump fluid pressures present, and, as a result, it is typical to provide a rather substantial friction between the sealing members, and if the pump is accidentally run dry, then one or both of the sealing members will most likely be damaged.

It is an object of this invention to provide an improved pump seal assembly wherein a variable bias is applied to sealing members, and thereby their life substantially extended.

SUMMARY OF THE INVENTION

In accordance with this invention, an auxiliary chamber, a seal chamber, is constructed around the shaft exit of a pump and at least partially filled with a lubricating fluid. In addition to providing a coil spring or other form of mechanical bias between stationary and rotating sealing members, fluid pressure from the pump is coupled through a pressure transmissive diaphragm or piston to the lubricating fluid of the seal chamber. In this manner, the seal chamber is pressurized to essentially the same pressure as the pump, and this pressure is employed to supplement the force of the spring, which then may provide substantially less force. Thus, by this arrangement, with full pumping pressure present, full maximum seal pressure would be exerted between the sealing members; but when pump pressure is reduced, or where there is zero pump pressure, the force on the seals is substantially reduced, and thereby a significant reduction in friction between the sealing members.

DETAILED DESCRIPTION OF THE DRAWINGS

Figure 1:
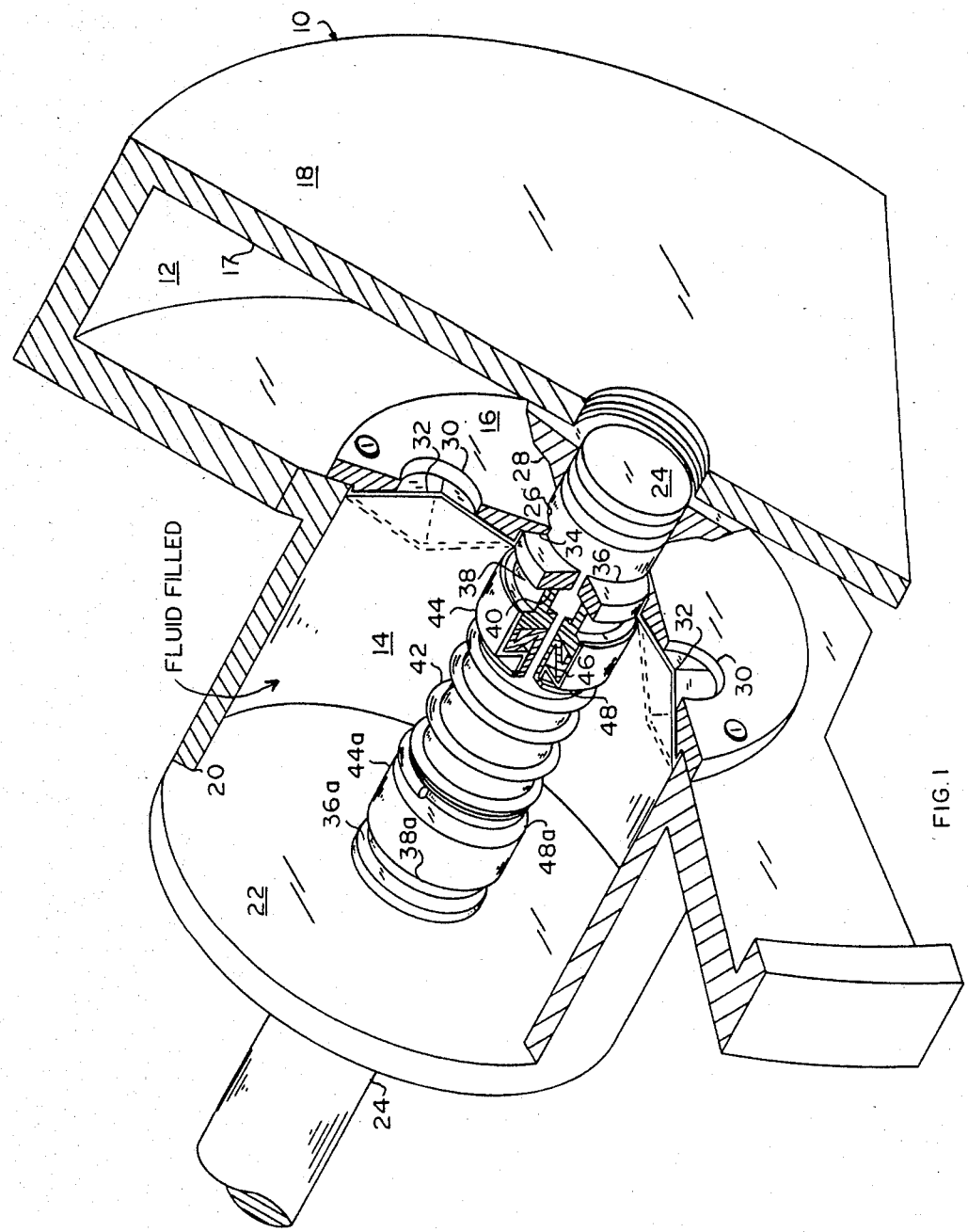
FIG. 1 is a pictorial view, partially in section and partially cut away, of an embodiment of the invention.

Referring to FIG. 1, pump housing 10 is configured to provide a cylindrical impeller chamber 12 and an adjoining, smaller, cylindrical seal chamber 14, the chambers being separated by a common wall or plate 16. The opposite end 17 of impeller chamber 14 is closed by end plate 22. Pump drive shaft 24, powered by means not shown, extends from the outside of pump housing 10 through end 20 of the pump housing and passes through seal chamber 14 into impeller chamber 12 through opening 26 where it is attached to and thereby rotates conventional impeller 28. Actual physical support for shaft 24 is provided by bearings (not shown) mounted on the outer side of wall 22. Plate 16 generally separates chambers 12 and 14, but includes one or more openings 30 which permit fluid under pressure from impeller chamber 12 to pass through and engage diaphragm 32.

Opening 26 of plate 16 includes about its circumference an L-shaped recess 34 facing the interior of seal chamber 14. Seal 36, typically formed of carbide, ceramic or other sealing material, is held stationary in L-shaped recess 34, and thus provides a seal between seal 36 and plate 16. Finally, the seal between chambers 12 and 14 is effected by annular T-shaped seal 38, which is frictionally held by and rotates with shaft 24, it having a face region 40 which makes a sealing engagement with seal 36 as seal 38 rotates with respect to seal 36. Seal 38 is biased to the right by spring 42 acting through spring retainer 44 and resilient retainer core 46.

A like sealing arrangement with like components (designated with the suffix "a") is employed to seal around shaft 24 where it passes through end plate 22 between the interior of seal chamber 14 and the exterior of pump housing 10. Thus, spring 42 applies a force to the left through spring retainer 44a and a retainer core (not shown) to T-shaped seal 38a, and the latter is thus urged into sealing engagement with seal 36a. Seal chamber 14 is filled with a lubricating liquid.

As discussed above, it has been a common practice to provide a bias force on a shaft seal for rotary pumps solely by means of a spring force on a rotating sealing member, which then applies a frictional force to a stationary seal member with which it is associated. In such case, this force must be such as to exceed the maximum pressure that may be anticipated as a counterforce from pressure in an impeller chamber on the stationary seal. Accordingly, the spring must be adapted to apply a rather substantial force. As indicated above, this is often the weak link in pump life and may be the determining factor in how long a pump will run without leaking. In contrast, and in accordance with this invention, the spring force is materially reduced by providing a supplemental variable biasing pressure which rises as needed. This is achieved by a force in an axial direction applied to seals 38 and 38a on faces 48 and 48a of retainers 44 and 44a, respectively. This fluid pressure is effected by lubricating fluid pressurized by engagement with diaphragm 32.

As pressure in impeller chamber 12 increases, diaphragm 32 is forced to the left in seal chamber 14, and thus there is applied an essentially equal pressure to the lubricating fluid within seal chamber 14 (filled or nearly so). As a result, increased force (in addition to that applied by spring 42) is applied to side faces 48 and 48a of engagement retainers 44 and 44a, which increased force is also applied to seals 38 and 38a. Thus, with only a minimum biasing force provided by spring 42, which would prevent leakage during periods when there is little pump pressure in chamber 12, increases in pressure are only effected as needed, and thus there is no greater frictional force between the sealing surfaces than necessary to offset the actual pressure build-up in chamber 12.

Figure 2:
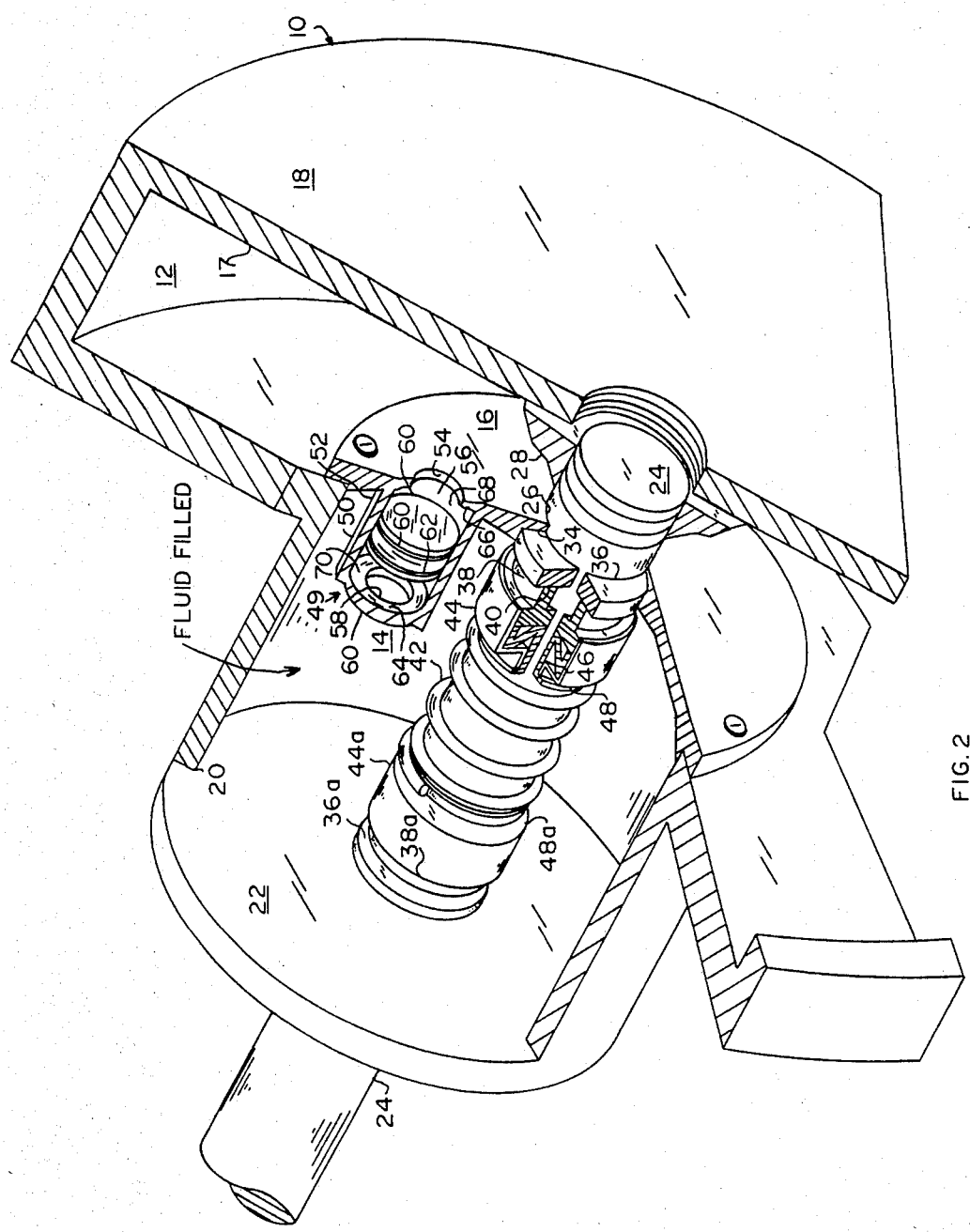
FIG. 2 is a pictorial view, partially in section and partially cut away, of an alternate embodiment of the invention.

The embodiment of the invention shown in FIG. 2 is identical with that shown in FIG. 1 as to the seal structure and spring, and identical components carry the same reference numerals as FIG. 1. It differs in that diaphragm 32, shown in FIG. 1, is replaced by a piston and cylinder assembly 49. Cylinder 50 (of approximately 1" diameter) of assembly 49 is rigidly mounted on its right end 52 to plate 16 and is positioned axially parallel to shaft 24. An opening 54 extends through plate 16 and provides communication from chamber 12 to the interior 56 of cylinder 50. An opening 58 is provided in the left end 60 of cylinder 50, and it allows communication from the interior 56 of cylinder 50 to fluid-filled chamber 14. A piston 60 having a diameter closely matching the inside diameter of cylinder 50 is slidably positioned as shown in the interior 56 of cylinder 50 to separate and isolate the fluids in chambers 12 and 14 and divide the interior 56 of cylinder 50 into right and left chambers 68 and 70, respectively. O-rings or other sealing members 60 and 62 perfect the seal of piston 60 within cylinder 50. Shoulders 64 and 66, formed by cylinder ends 52 and 60, respectively, of cylinder 50, maintain piston 60 within cylinder 50 and limit the travel of piston 60. Typically, the dimensions of cylinder 50 and piston 60 are such that the displacement of fluid caused by the movement of piston 60 from shoulder 66 to shoulder 64 is approximately one cubic inch.

In operation, pressure created at a diametric point of opening 54 in impeller chamber 12 is applied through opening 54 to right chamber 68 of cylinder 50 where pressure is applied against piston 60. Piston 60 in turn moves slightly to the left and applies pressure against the fluid within left chamber 70 which is communicated via opening 58 to chamber 14. This applies a like pressure to sides 45 and 45a of rotating seals 38 and 38a which, as in the case of the embodiment shown in FIG. 1, provides a supplemental biasing force which adds to that provided by spring 42 to provide a total biasing force to the sealing members. Thus, by virtue of the reduction of biasing force when there is little or no fluid pressure in pump chamber 12, the frictional force between relatively rotating sealing members is significantly reduced and thereby their life materially extended.

In summary, by providing, as needed, supplemental hydraulic biasing of the seals, static biasing by spring tension may be reduced by a factor of 10 to 1, which, together with lubrication provided by the seal chambers, results in a dramatic decrease in incidences of seal failures.

I claim:
1. A rotary pump assembly comprising:
   a generally circular pump enclosure;
   a seal enclosure sharing a common wall with said pump enclosure, and said seal enclosure having a wall opposite to that of said common wall;
   a lubricating fluid within said seal enclosure;
   a rotary pump positioned within said pump enclosure and having a driven shaft which passes through said walls;
   first and second stationary shaft sealing members positioned around said shaft in opposite walls of said seal enclosure, and said sealing members having facing planar seal surfaces;
   first and second spaced rotating seal members around and rotating with said shaft, said first rotating seal member having a planar surface positioned adjacent to and adapted to frictionally engage said first stationary seal member, and said second rotating seal member having a planar surface adjacent to and adapted to frictionally engage with the planar surface of said second stationary seal member;
   spring bias means for applying a bias to said rotating sealing members for biasing and rotating sealing members against said stationary sealing members;
   an opening in said common wall from said seal enclosure to said pump enclosure and intercepting a radial position in said pump enclosure which is intermediately between a said shaft opening and the circumference of said pump enclosure;
   a piston casing positioned within said seal enclosure and projecting from and transverse with respect to said common wall, said casing having a first end region secured to said common wall around said opening, and a second end region opening into said seal enclosure; and
   a piston axially movable within said casing adjacent said common wall, said piston being movable intermediately between said first and second end regions and sealably interrupting a passageway between said seal enclosure and said pump enclosure, whereby the fluid pressure in said pump enclosure adjacent to said opening, being a pressure in a basically intermediate radial region of said pump enclosure, is directly transmitted through said opening to said piston to said lubricating fluid in said seal enclosure, and then, as an additional bias, to said rotating seal members.

\* \* \* \* \*